No. 11,768. Reissued Aug. 29, 1899.

C. J. BAILEY.

BICYCLE TIRE.

(Application filed July 15, 1899.)

Witnesses,
Edward F. Allen.
Adolf C. Kaiser.

Inventor;
Charles J. Bailey,
by Crosby & Gregory
attys.

UNITED STATES PATENT OFFICE.

CHARLES J. BAILEY, OF NEWTON, MASSACHUSETTS.

BICYCLE-TIRE.

SPECIFICATION forming part of Reissued Letters Patent No. 11,768, dated August 29, 1899.

Original No. 588,724, dated August 24, 1897. Application for reissue filed July 15, 1899. Serial No. 724,015.

*To all whom it may concern:*

Be it known that I, CHARLES J. BAILEY, of Newton, county of Middlesex, State of Massachusetts, have invented an Improvement in Bicycle-Tires, of which the following description, in connection with the accompanying drawings, is a specification, like letters on the drawings representing like parts.

This invention has for its object the production of a novel tire for vehicles which will possess great resiliency, tending to augment the speed of the wheel and ease of movement to the rider, the tire when pneumatic being less liable to be punctured than tires of usual construction. Owing to its peculiar construction, mud and water which may be taken up by the tire from the roadway is so quickly discharged that it has no opportunity to rise far enough to be thrown off forwardly at such a tangent as to meet the back of the rider.

My improved tire presents at its tread-surface a series of teeth extended each independently of the other from a base-line, the sides of said teeth being tapered from their inner ends toward their outer ends, said teeth being capable of being flexed or bent aside independently one of the other, each tooth when so bent aside bringing up against and being supported in a yielding manner by adjacent teeth. The ends of these teeth will preferably present plane or flat surfaces, as thereby the holding force of each individual tooth on the roadway is greatly increased and slipping is prevented.

Figure 1:
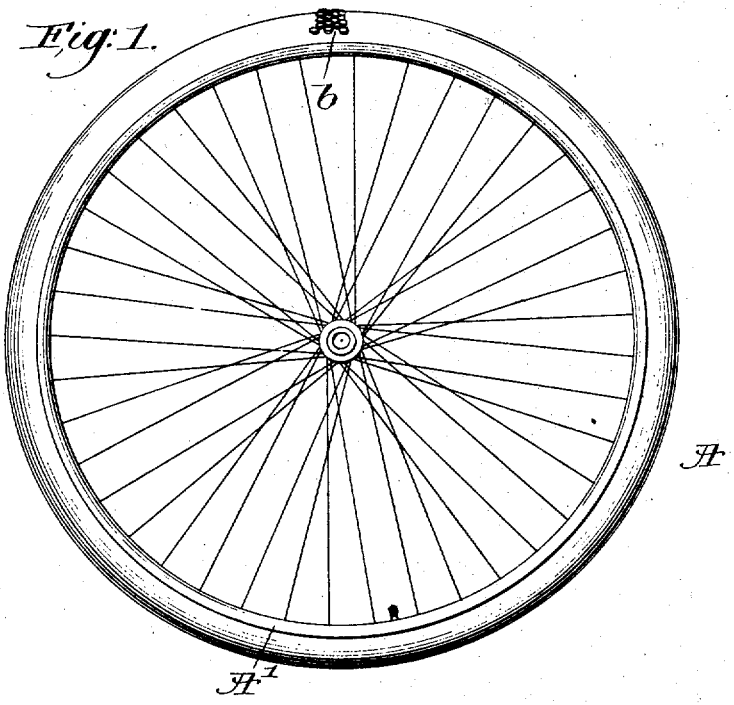
Figure 2:
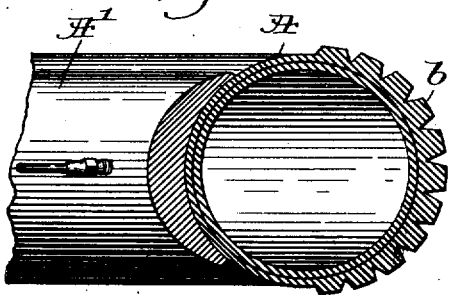
Figure 3:
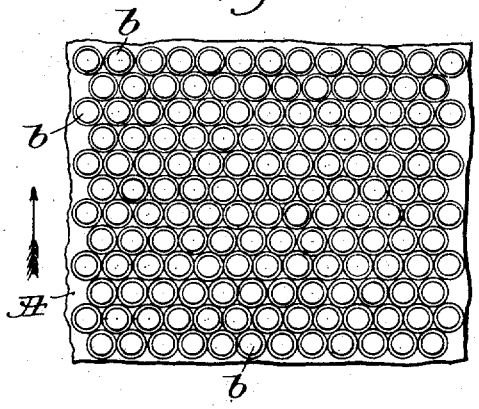

Figure 1, in side elevation, shows a wheel provided with a tire, part of the surface of the tire showing my improvement. Fig. 2 is an enlarged cross-section taken through the rim of said wheel and the tire thereon; and Fig. 3 represents a part of the tire laid out flat, it illustrating the staggering of the teeth.

The bicycle-tire herein shown is of a variety known as "single-tube;" but it may be of any known variety, my peculiar tread-surface being equally applicable to any form of india-rubber or pneumatic tire.

Let A represent the tire, and A' the rim on which it is placed. From the surface or base-line of this tire is extended outwardly a series of distinct independent teeth *b*, said teeth, let it be supposed, being about four-sixteenths of an inch in diameter at their bases, the sides of the teeth equal to a length of, say, three thirty-seconds of an inch, tapering toward the free ends of the teeth, which may be, say, three-sixteenths of an inch in diameter at said free end, forming frusto-conical teeth or columnar projections, the bases of which are preferably tangent to each other. Preferably the ends of these teeth will present substantially flat faces, leaving the edge or junction of the faces and side walls of the teeth to engage and cling to the roadway or surface on which the tire is moving, said teeth at such time under the weight of the load being flexed and compressed and expanded freely laterally to the road or to any unevenness of the roadway or surface, the said compression and consequent lateral spread of the teeth tending to momentarily fill the spaces between the teeth, each tooth while being released from pressure acting by its own resiliency to resume quickly its normal position. While coming from its abnormal flexed or compressed state into its normal straight position, as will be the case as each tooth is relieved from pressure, mud or water on or between the teeth is instantly thrown off and downwardly onto the roadway immediately behind the wheel, so that it cannot strike the rider. These teeth (see Fig. 3, which represents a part of the tire spread out flat) are staggered or offset one from the other laterally and also in the direction of the length of the tread-surface of the tire, said length being designated by the arrow on Fig. 3, such staggering of the teeth obviating any straight lines of grooves or depressions lengthwise of the tread of the tire, and this staggering also affords a more equable and uniform support.

The peculiar and novel construction described is very effective and is especially applicable to bicycle-tires or to any form of india-rubber or pneumatic tire to prevent slipping of the tread-surface of the tire either laterally or otherwise on the road-surface, for the reason that the teeth individually engage such surface, and, further, that the pressure on the teeth flattens some of them down, while other teeth not so much flexed engage the roadway.

This tire—*i. e.*, a tire having my improved tread-surface—will run without slipping on any hard or smooth surface, and in case a tack or thorn is met in the roadway it will on striking one of the flexible teeth be tipped or diverted in its movement, turning around usually to occupy a flat or lengthwise position with relation to the tire, and the distance from the face of the teeth to the base-line of the tire also prevents the liability of a tack entering the base-line of the tread-surface to produce a puncture.

It is well known that a tire having a substantially smooth surface when flattened on a road excludes the air from between the tread of the tire and the road-surface, making the tire stick, as it were, to the surface, thus producing a sort of dragging action which retards the speed of the wheel and to overcome which requires an increased expenditure of power. Attempts have been made to prevent this drag or suction of the tire on or with relation to the road-surface, and tires have been scored with the idea that air would always stand in the scores, so as to be present at the road-surface, but in practice such scores immediately fill with mud and dirt. By providing the tread-surface with the independent flexible projections or teeth herein shown and described the mud and dirt is to a great extent prevented from adhering to the tire by the substantial filling up of the spaces by compression of the teeth as the tire advances, thus presenting a nearly smooth surface at the point of contact with the ground, and any slight amount of mud or dirt which may be caught between the teeth as they are thus compressed will be loosened and thrown off by the contraction of the teeth as they assume their normal positions immediately upon breaking contact with the ground or other surface. As the teeth meet the road or other surface the numerous air-spaces between them will prevent any tooth or series of teeth from getting anything like a suction-hold on the road. My improved tire may consequently be run with but the expenditure of the minimum of power, and consequently the speed of a wheel provided with this tire may, with the same expenditure of power, be greatly increased.

As before stated, my improved tire, presenting a number of flexible projections or teeth in contact simultaneously with a smooth road-surface—say a surface of glass—will not slip, but will run steadily. This invention is not limited, however, to the exact diameter or length of the said independent teeth nor to the exact shape shown, for the teeth so long as they rise each from a base-line and each is free to be flexed and in being flexed tends to momentarily fill more or less the space between the teeth.

Having described my invention, what I claim as new, and desire to secure by Letters Patent, is—

1. A tire having a tread-surface provided with a series of relatively soft, separated and distinct resilient teeth, leaving spaces between them which in the use of the tire in riding are momentarily filled by the compression and flattening of the teeth, substantially as described.

2. A pneumatic tire composed of an endless inflatable tube having an integral tread-surface provided with a series of frusto-conical resilient projections having flattened outer ends, the bases of said projections being substantially tangent to each other and staggered in the direction of the length of the tire tread-surface, whereby the spaces between the side walls of said projections will be momentarily filled upon compression and flattening thereof in use, to thus form an evenly-yielding cushion-contact for the tire, substantially as described.

3. A tire having a tread-surface provided with a series of separate and distinct flexible teeth extended from a base-line, said teeth being located close together so that pressure applied to said tread bends said teeth over one on or against the other, the said teeth returning to correct position when relieved from pressure, substantially as described.

4. A tire having a tread-surface provided with a series of separated and distinct resilient, columnar projections, said projections being free to yield laterally when compressed and momentarily fill the spaces between them, whereby the tread-surface is substantially flattened at the point of contact and immediately resumes its normal irregular contour upon release of the compressed projections, substantially as described.

5. A tire having a tread-surface provided with a series of frusto-conical resilient projections having flattened outer ends, the bases of said projections being substantially tangent to each other, whereby the spaces between the side walls of said projections will be momentarily filled upon compression and flattening thereof, to form an evenly-yielding cushion-contact for the tire, substantially as described.

6. A tire having a tread provided with a series of relatively soft, separated and distinct resilient teeth, the teeth being gradually compressed and flattened when in use to fill the spaces between them and present a substantially continuous tread-surface at the contact-point of the tire, and the teeth thereafter instantly contracting to open up the spaces, displacing and freeing the tire from mud or dirt, substantially as described.

In testimony whereof I have signed my name to this specification in the presence of two subscribing witnesses.

CHARLES J. BAILEY.

Witnesses:
M. S. LAWRENCE,
S. G. MILLS.